United States Patent
Thokala et al.

(10) Patent No.: US 11,961,028 B2
(45) Date of Patent: Apr. 16, 2024

(54) METHOD AND SYSTEM FOR GRAPH SIGNAL PROCESSING BASED ENERGY MODELLING AND FORECASTING

(71) Applicant: Tata Consultancy Services Limited, Mumbai (IN)

(72) Inventors: Naveen Kumar Thokala, Hyderabad (IN); Spoorthy Paresh, Bangalore (IN); Vishnu Brindavanam, Hyderabad (IN); Mariswamy Girish Chandra, Bangalore (IN)

(73) Assignee: Tata Consultancy Limited Services, Mumbai (IN)

( * ) Notice: Subject to any disclaimer, the term of this patent is extended or adjusted under 35 U.S.C. 154(b) by 156 days.

(21) Appl. No.: 17/649,170

(22) Filed: Jan. 27, 2022

(65) Prior Publication Data

US 2022/0237544 A1    Jul. 28, 2022

(30) Foreign Application Priority Data

Jan. 28, 2021 (IN) .............................. 202121003901

(51) Int. Cl.
*G06Q 10/0631* (2023.01)
*G06F 30/20* (2020.01)
(Continued)

(52) U.S. Cl.
CPC ....... *G06Q 10/06315* (2013.01); *G06F 30/20* (2020.01); *G06Q 50/06* (2013.01); *G06F 2119/06* (2020.01)

(58) Field of Classification Search
CPC .............................................. G06Q 10/06315
See application file for complete search history.

(56) References Cited

U.S. PATENT DOCUMENTS 11,163,925 B1 * 11/2021 Schneider ............ G05B 13/048
11,301,771 B2 * 4/2022 Kolter ...................... G06N 7/01
(Continued)

FOREIGN PATENT DOCUMENTS

CN    106570581 A    4/2017
CN    111461392 A    7/2020

OTHER PUBLICATIONS

Zhao et al., On a Training-Less Solution for Non-Intrusive Appliance Load Monitoring Using Graph Signal Processing, in IEEE Access, vol. 4, pp. 1784-1799, 2016 (Year: 2016).*

(Continued)

*Primary Examiner* — Andre D Boyce
(74) *Attorney, Agent, or Firm* — Finnegan, Henderson, Farabow, Garrett & Dunner, L.L.P.

(57) ABSTRACT

Energy consumption modelling requires to consider various factors affecting the energy consumption in buildings, to be able to effectively forecast future consumption. Even though some of the state of the art deep learning based approaches are able to address these requirements to some extent, they are computationally heavy. The disclosure herein generally relates to energy forecasting, and, more particularly, to a method and system for graph signal processing (GSP) based energy modelling and forecasting. The system monitors and collects information on energy consumption in a building and values of associated energy consumption parameters. This input data is further processed using GSP to generate a building energy consumption model, from which a smooth signal is obtained by applying total variation minimization. The system further performs forecasting using the smooth signal.

6 Claims, 7 Drawing Sheets

(51) Int. Cl.
*G06F 119/06* (2020.01)
*G06Q 50/06* (2012.01)

(56) References Cited

U.S. PATENT DOCUMENTS

| | | | | |
|---|---|---|---|---|
| 2010/0332373 | A1* | 12/2010 | Crabtree | G06Q 40/04 |
| | | | | 709/224 |
| 2020/0133978 | A1* | 4/2020 | Ramamurti | G06F 8/38 |
| 2021/0125197 | A1* | 4/2021 | Lopuch | G06Q 50/06 |
| 2021/0149353 | A1* | 5/2021 | Suindykov | G06F 30/13 |
| 2021/0158975 | A1* | 5/2021 | Turney | G16Y 40/20 |

OTHER PUBLICATIONS

Hu et al., Towards a Graph Signal Processing Framework for Modeling Power System Dynamics, 2019 IEEE Global Conference on Signal and Information Processing (GlobalSIP), (Year: 2019).*
Carrillo et al., High-Resolution PV Forecasting from Imperfect Data: A Graph-Based Solution, Energies 2020, 13 (21), 5763 (Year: 2020).*

* cited by examiner

METHOD AND SYSTEM FOR GRAPH SIGNAL PROCESSING BASED ENERGY MODELLING AND FORECASTING

PRIORITY CLAIM

This U.S. patent application claims priority under 35 U.S.C. § 119 to: Indian Patent Application No. 202121003901, filed on Jan. 28, 2021. The entire contents of the aforementioned application are incorporated herein by reference.

TECHNICAL FIELD

The disclosure herein generally relates to energy forecasting, and, more particularly, to a method and system for graph signal processing energy modelling and forecasting.

BACKGROUND

Building load forecasting is useful in several applications like electricity purchase, budget planning, and to address demand-response programs. In many scenarios, governing bodies of many places may have to purchase energy from energy markets so as to meet energy requirements of people. Such energy requirements may be from homes, commercial buildings, industries and so on. There are various factors which affect energy consumption in buildings. For example, if energy consumption in an office building is considered, corresponding pattern would indicate that energy consumption is maximum on weekdays (i.e. office working days) and is minimum over weekends/holidays (office non-functioning days). Likewise, at homes energy consumption would be less over weekdays as kids and parents are likely to be at school and offices respectively, and the energy consumption would be higher on holidays if the family is at home. Considering such usage patterns while procuring energy can help plan expenses wisely.

Energy forecasting helps estimate the energy requirements, by considering such usage patterns, so that the purchase and other activities can be planned accordingly. Machine learning based approaches are available for such forecasting purpose. However, disadvantage/limitation of the state of the art techniques which employ the machine learning algorithms for prediction is that they tend to rely on an assumption that incoming data is independent and is identically distributed, which may not be always true for time series data collected as input. Another disadvantage is that these systems fail when there is a concept drift in input data. Some other state of the art systems which rely on deep learning models can address the aforementioned limitations of the machine learning based models. However, they are computationally heavy.

SUMMARY

Embodiments of the present disclosure present technological improvements as solutions to one or more of the above-mentioned technical problems recognized by the inventors in conventional systems. For example, in one embodiment, a processor implemented method of building energy forecasting is provided. Initially, data on energy consumption in a building for a pre-defined time window, and a plurality of corresponding energy consumption parameters, as input, via one or more hardware processors. Further, a building energy consumption model is generated by processing the plurality of energy consumption parameters via the one or more hardware processors, using a Graph Signal Processing (GSP) modelling. The GSP modelling includes constructing a graph for a measured energy value of the building, using the following method. In this approach, a weighted adjacent matrix of the GSP is built using the plurality of energy consumption parameters. Further, samples of the measured energy value are used as nodes of the graph, and then weight of edge between each set of nodes of a graph for each sample of the measured energy value is determined based on a) vector difference between energy consumption parameters, and b) a co-variance matrix of the plurality of energy consumption parameters, wherein the weight of each edge is calculated for a pre-defined time window. Post the GSP modelling, a smooth signal is generated by minimizing variation of the graph by performing total variation minimization on the graph, via the one or more hardware processors, and then a forecast is generated using the smooth signal, via the one or more hardware processors. The generated forecast is then used to fill a plurality of missing values in the graph, via the one or more hardware processors.

In another aspect, a system for building energy forecasting is provided. The system includes one or more hardware processors, a communication interface, and a memory storing a plurality of instructions. The plurality of instructions when executed, cause the one or more hardware processors to initially collect data on energy consumption in a building for a pre-defined time window and a plurality of corresponding energy consumption parameters, as input. The system then generates a building energy consumption model by processing the plurality of energy consumption parameters, using a Graph Signal Processing (GSP) modelling. The GSP modelling includes constructing a graph for a measured energy value of the building, using the following method. In this approach, a weighted adjacent matrix of the GSP is built using the plurality of energy consumption parameters. Further, samples of the measured energy value are used as nodes of the graph, and then weight of edge between each set of nodes of a graph for each sample of the measured energy value is determined based on a) vector difference between energy consumption parameters, and b) a co-variance matrix of the plurality of energy consumption parameters, wherein the weight of each edge is calculated for a pre-defined time window. Post the GSP modelling, the system generates a smooth signal by minimizing variation of the graph by performing total variation minimization on the graph, and then generates a forecast using the smooth signal. The system then uses the generated forecast to fill a plurality of missing values in the graph.

In yet another aspect, a non-transitory computer readable medium for building energy forecasting is provided. Initially, data on energy consumption in a building for a pre-defined time window, and a plurality of corresponding energy consumption parameters, as input, via one or more hardware processors. Further, a building energy consumption model is generated by processing the plurality of energy consumption parameters via the one or more hardware processors, using a Graph Signal Processing (GSP) modelling. The GSP modelling includes constructing a graph for a measured energy value of the building, using the following method. In this approach, a weighted adjacent matrix of the GSP is built using the plurality of energy consumption parameters. Further, samples of the measured energy value are used as nodes of the graph, and then weight of edge between each set of nodes of a graph for each sample of the measured energy value is determined based on a) vector difference between energy consumption parameters, and b)

a co-variance matrix of the plurality of energy consumption parameters, wherein the weight of each edge is calculated for a pre-defined time window. Post the GSP modelling, a smooth signal is generated by minimizing variation of the graph by performing total variation minimization on the graph, via the one or more hardware processors, and then a forecast is generated using the smooth signal, via the one or more hardware processors. The generated forecast is then used to fill a plurality of missing values in the graph, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
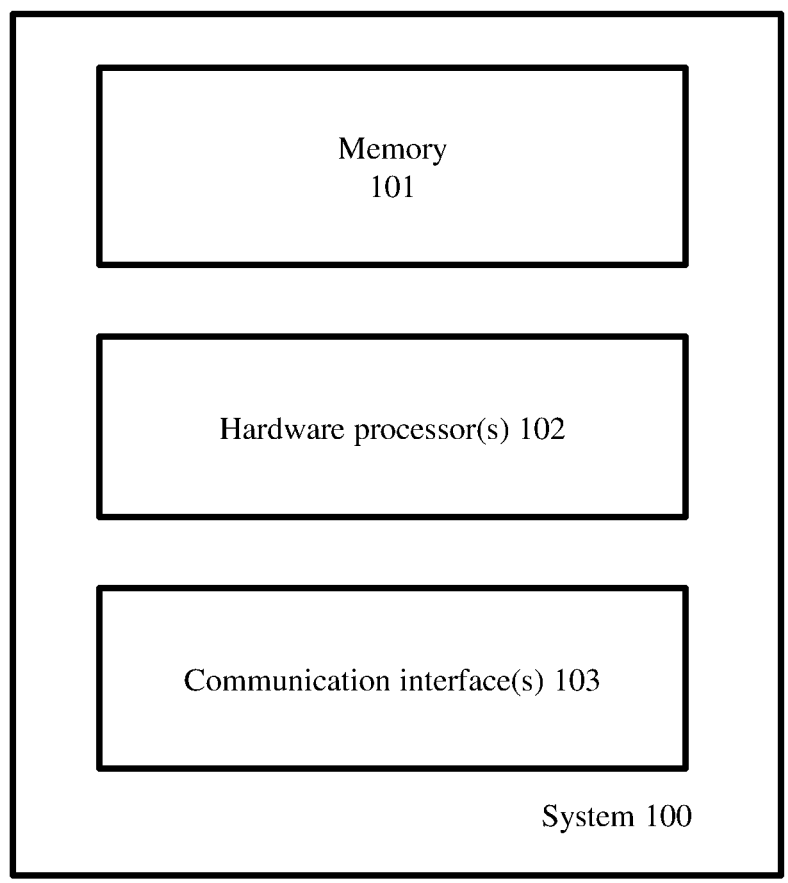
FIG. 1 illustrates an exemplary system for energy model generation and forecasting, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 4D, where similar reference characters denote corresponding features consistently throughout the figures, there are shown preferred embodiments and these embodiments are described in the context of the following exemplary system and/or method.

FIG. 1 illustrates an exemplary system for energy model generation and forecasting, according to some embodiments of the present disclosure. The system 100 includes one or more hardware processors 102, communication interface(s) or input/output (I/O) interface(s) 103, and one or more data storage devices or memory 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more components (not shown) of the system 100 can be stored in the memory 101. The memory 101 is configured to store a plurality of operational instructions (or 'instructions') which when executed cause one or more of the hardware processor(s) 102 to perform various actions associated with the process of energy forecasting being performed by the system 100. The system 100 can be implemented in a variety of ways as per requirements. Various steps involved in the process of the energy forecasting being performed by the system 100 of FIG. 1 are depicted in FIG. 2 and FIG. 3, and are explained with reference to the hardware components depicted in FIG. 1.

Figure 2:
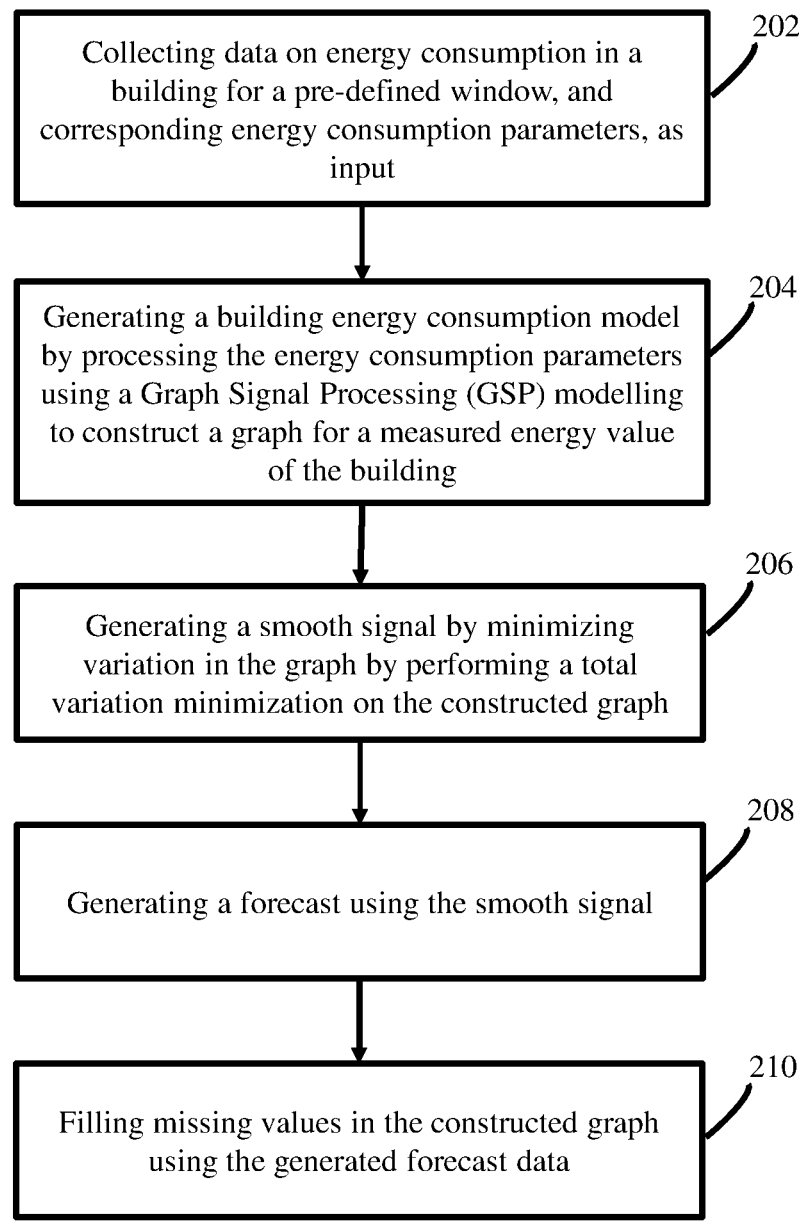
FIG. 2 is a flow diagram depicting steps involved in the process of performing energy forecasting, by the system of FIG. 1, according to some embodiments of the present disclosure.
Figure 3:
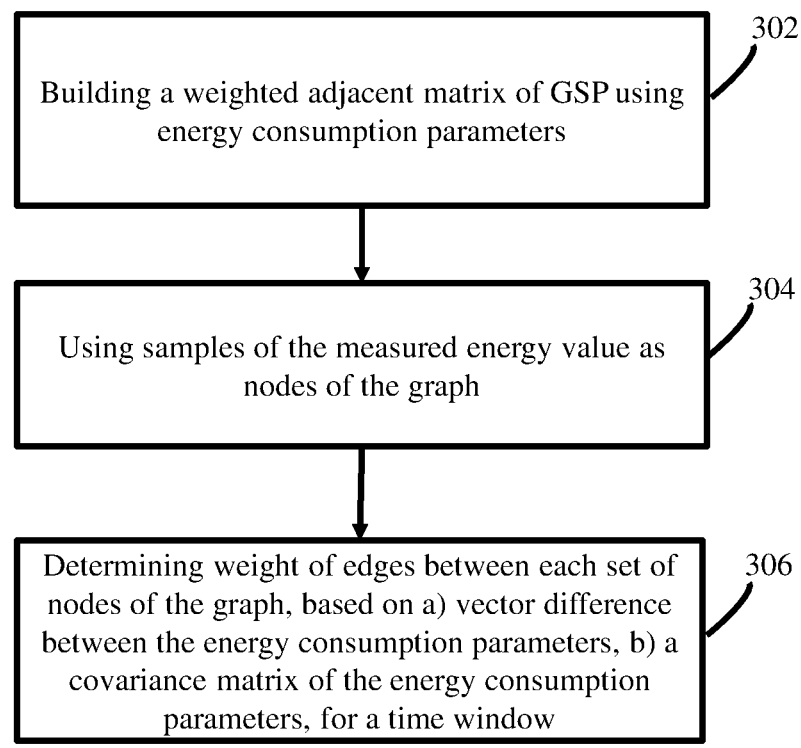
FIG. 3 is a flow diagram depicting steps involved in the process of constructing a graph by processing the energy consumption parameters using the GSP, by the system of FIG. 1, in accordance with some embodiments of the present disclosure.

FIG. 2 is a flow diagram depicting steps involved in the process of performing energy forecasting, by the system of FIG. 1, according to some embodiments of the present disclosure.

At step 202, the system 100 collects information such as but not limited to energy consumption in a building being monitored, and corresponding energy consumption parameters as input. The energy consumption parameters may include, but not limited to, occupancy of the building, weather information of the region in which the building being monitored is located, and other contextual information like time of the day, day of the week, and holiday information, which impact the energy consumption of the building.

Further, at step 204, a building energy consumption model is generated, which involves constructing a graph representing the energy consumption at the building, by processing the energy consumption parameters (also referred to as "parameters") using a Graph Signal Processing (GSP) approach, which is explained below:

Let $p(t_i)$ be the measured energy value of the building at time instance $t_i$. An N-length graph G=(V,A) is constructed such that each vertex of the graph is associated to one sample of $p(t_i)$. A is the adjacency matrix defining the edges between the vertices. The system 100 defines the weighted adjacency matrix using the energy consumption parameters. Nodes with similar input parameters have an edge with larger weight. A Gaussian kernel density function is used to define the weights of the edges between the nodes of the graph. The weights of an existing edge connecting vertices (i; j) is expressed as in equation 1.

$$A(i, j) = \exp\left\{\frac{-(s_i - s_j)^2}{\sigma^2}\right\} \quad (1)$$

Where $s_i$ and $s_j$ are signal values at nodes i and j respectively.

In the GSP based approach used by the system 100, the system 100 builds the adjacency matrix using the energy consumption parameters, wherein a set (c) the energy consumption parameters used are, a) temperature (T), b) occupancy (O), c) day of the week (D), and d) time of the day(t). c at node i is defined as a vector:

$$c_i = [T_i, O_i, D_i, t_i] \quad (2)$$

The weight of the edge between nodes i and j is defined as follows:

$$A(i,j) = \exp(\Delta c_{i,j}^T \Sigma^{-1} \Delta c_{i,j}) \quad (3)$$

where $\Delta c_{i,j} = c_i - c_j$ is the vector difference between the input parameters at nodes i and j and $\Sigma^{-1}$ is the co-variance matrix of all the energy consumption parameters and is a symmetric matrix in which all the diagonal elements represent the variance of the respective input parameters and off-diagonal elements represent the co-variances between the energy consumption parameters.

In the graph constructed using the aforementioned approach, each vertex represents one sample of the energy value. Energy values are taken as the graph signal on these vertices and the weight of the edges between any two vertices are calculated using the equation 3 in such a way that they represent the similarity between the two instances of energy consumption. The constructed graph satisfies property of piece-wise smoothness, i.e. the value of the graph signal does not abruptly change in its neighbourhood i.e. at similar nodes.

Further, at step 206, the system 100 generates a smooth signal by minimizing variation in the graph by performing a total variation minimization on the constructed graph. The step of performing the total variation minimization is explained below:

Consider that energy values for n time instants are available and for rest of the instances the energy values need to be forecasted. The system 100 uses the known values for training of the graph, and then to forecast next (N−n) values. For this purpose, N-length graph signal s is defined as:

$$s = \begin{cases} p_i & \text{if } i \le n \\ 0 & \text{otherwise} \end{cases} \quad (4)$$

Second part of this signal is to be computed, as it gives estimate of energy consumption in the building.

For this purpose, the system 100 then creates a weighted adjacency matrix A for the graph such that the weight of the edge between the two vertices describe their correlation. As weight matrix plays an important role in the GSP technique used, the weights of the edges are determined by the system 100 as explained below. The system 100 determines Degree matrix D and Laplacian matrix L, and then applies the total variation minimization on the graph signal. Due to this intrinsic nature of graph construction, true values of energy usage forms a low-frequency graph signal (alternately referred to as 'smooth signal') s, having a small value of the total variation $s^T L s$. Hence the system 100 finds the smooth signal by minimizing the total variation. Labelled training samples for i≤n are close in value to the unknown samples, i>n, for the similar nodes as they have large edge weights A(i, j). Smooth graph signal prior ensure that the testing samples have similar values as that of training samples.

The second part of this smooth signal by minimizing the total variation of the graph signal i.e.

$$\min_s \|s^T L s\|_2^2 \quad (5)$$

As value of $s_{1:n}$ is known, (5) can be rewritten as:

$$s^T L s = [S_A \ S_B]\begin{bmatrix} L_{AA} & L_{AB} \\ L_{BA} & L_{BB} \end{bmatrix}\begin{bmatrix} s_A \\ s_B \end{bmatrix} \quad (6)$$

Where $s_A$ is labeled training samples of the graph signal for i≤n and $s_A = s_{1:n}$, $s_B$ is the signal value that is to be estimated for i=n+1:N, and $s_B = s_{n+1:N}$, $L_{AA}$ is top left sub-matrix of the Laplacian matrix for indexes 1:n, 1:n (rows, columns), $L_{AB}$ is top right sub-matrix of the Laplacian matrix for indexes 1:n, n+1:N, $L_{BA}$ is bottom left sub-matrix of the Laplacian matrix for indexes n+1: N, 1:n, and $L_{BB}$ is bottom right sub-matrix of the Laplacian matrix for indexes n+1:N, 1:n:N.

All the sub-matrices are conformable for matrix multiplication and the above matrix multiplication results when expanded, is represented as:

$$s^T L s = s_A^T L_{AA} s_A + s_A^T L_{AB} s_B + s_B^T L_{BA} s_A + s_B^T L_{BB} s_B \quad (7)$$

As the Adjacency matrix A is symmetric and D is diagonal, the Laplacian matrix L is symmetric, hence $$s_A^T L_{AB} s_B = s_B^T L_{BA} s_A \quad (8)$$

As $s_A$ is constant in (7), the first term does not affect minimization, hence the Total Variation Minimization can be rewritten as:

$$\arg\min\|s^T L s\|_2^2 = \arg\min\{2 s_B^T L_{BA} s_A + s_B^T L_{BB} s_B\} \quad (9)$$

A closed form solution for (9) is provided as:

$$s^*_B = L_{BB}^+ * (-s_A^T) * L_{AB}^T \quad (10)$$

Where $L_{BB}^+$ is pseudo inverse of the matrix $L_{BB}$ and $s^*_B$ is estimate of $S_{n+1:N}$, and hence is forecast of energy usage for the period $t_{n+1}$ to $t_N$, generated at step 208. The forecasted data may be provided as output to a user of the system 100.

Further, at step 210, the system 100 may fill missing values in the graph constructed at step 204, using the forecasted data, thereby fine-tuning the building energy consumption model.

In various embodiments, the steps in method 200 may be performed in the same order as depicted in FIG. 2 or in any alternate order that is technically feasible. In another embodiment, one or more steps of the method 200 may be omitted if required.

Applications of the Forecasting Method and the Building Energy Consumption Model The building energy consumption model generated by the system 100 may be used for various forecasting applications such as, but not limited to:

Day-ahead forecast where hourly consumption data is used as input and requires to predict 24 values.

Month ahead and Quarter ahead forecast where day-wise energy consumption is used for building the models.

a) Day-Ahead Forecast:

The Day-ahead forecasting is required for purchasing of energy (bidding), addressing demand response and energy benchmarking. In day-ahead forecast, hourly consumption data is used for building energy modelling. The graph is constructed using the hourly consumption data and the remaining inputs are considered as follows Occupancy—Average occupancy of the day is used for modelling and so typically this remains constant across the day and varies depending on day of the week, working day or holiday.

Temperature—Hourly temperature values.

day of the week (Sunday to Saturday).

working day or holiday.

Figure 4A:
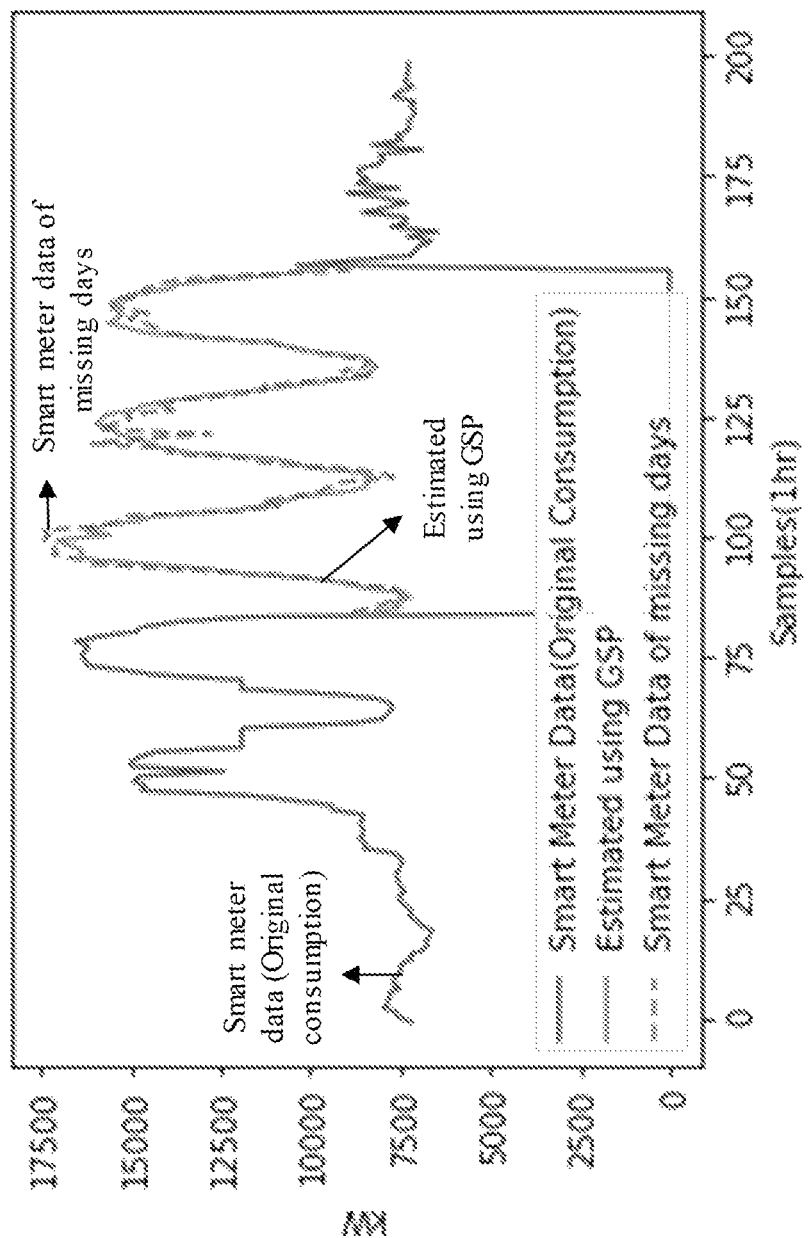
FIG. 4A is an example of graphical representations depicting missing value estimation by the system of FIG. 1, and comparison with a few state of the art techniques, in accordance with some embodiments of the present disclosure.

Missing values in smart meter data are quite common due to many reasons like smart meter failures, communication failures etc. Treating missing values is very important to build good models for forecasting and so it is essential to treat the missing values before we use these models for forecasting. The proposed model is used to estimate the energy consumption at those time instants where energy data is missing by tweaking the model. Unlike forecasting, missing values could be anywhere in the data series, so it is solved by considering the missing instants at the end of the graph signal and similar approach (used for forecasting) is used to estimate the missing values. Hence, missing values are estimated using both preceding and succeeding values, so it is comparatively more accurate than forecasting. Example values obtained via the missing value estimation are depicted in FIG. 4A.

Figure 4B:
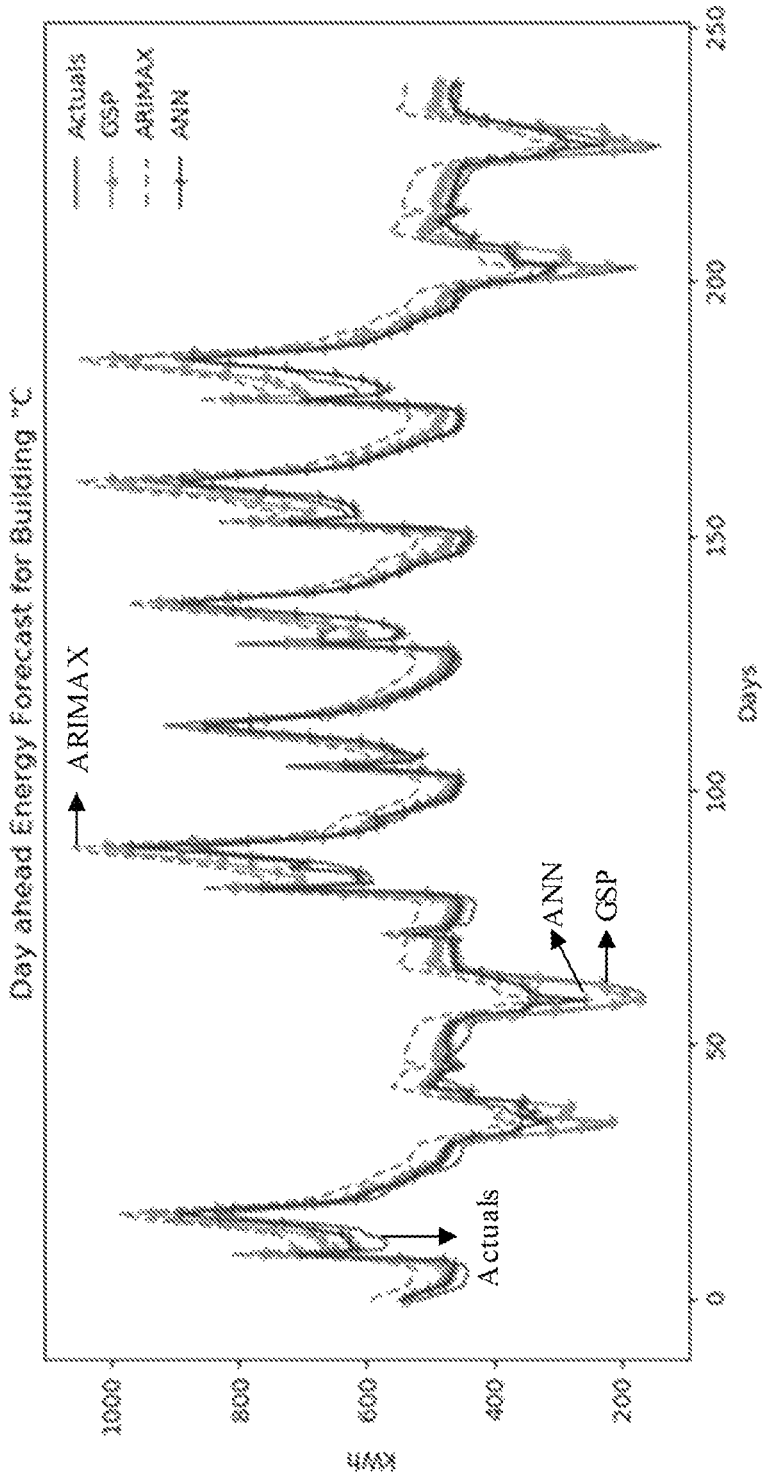
FIG. 4B is an example of graphical representations depicting day ahead forecast by the system of FIG. 1, and comparison with a few state of the art techniques, in accordance with some embodiments of the present disclosure.

Day-ahead forecasting consists of building the N length graph with the last 24 values as zeros and use the steps in method 200 to estimate the hourly consumption values. The forecasting results are compared with the ARIMAX and ANN. FIG. 4B shows that the forecasting accuracy of system 100 is better than ARIMAX and almost same as ANN. The performance of the method 200 was validated using four actual buildings data from varied climatic zones of India and the performance was compared using Mean Average Percentage Error (MAPE) and Normalized Root Mean Square Deviation (NRMSD) as mentioned in the Tables 1 and 2 respectively. MAPE and NRMSD values are computed by taking the average over 10 days of day-ahead forecast for all the buildings.

b) Month and Quarter Ahead Forecast

Figure 4C:
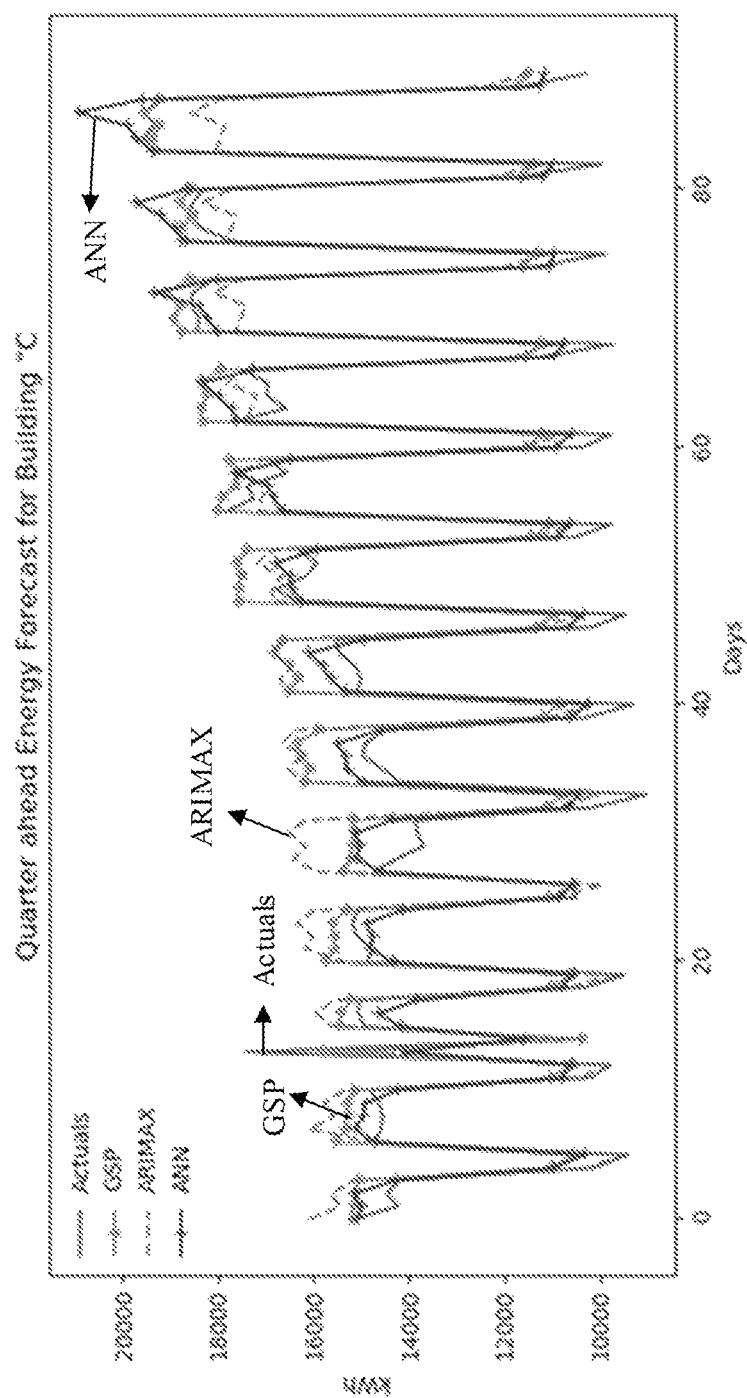
FIG. 4C is an example of graphical representations depicting quarter ahead forecast by the system of FIG. 1, and comparison with a few state of the art techniques, in accordance with some embodiments of the present disclosure.
Figure 4D:
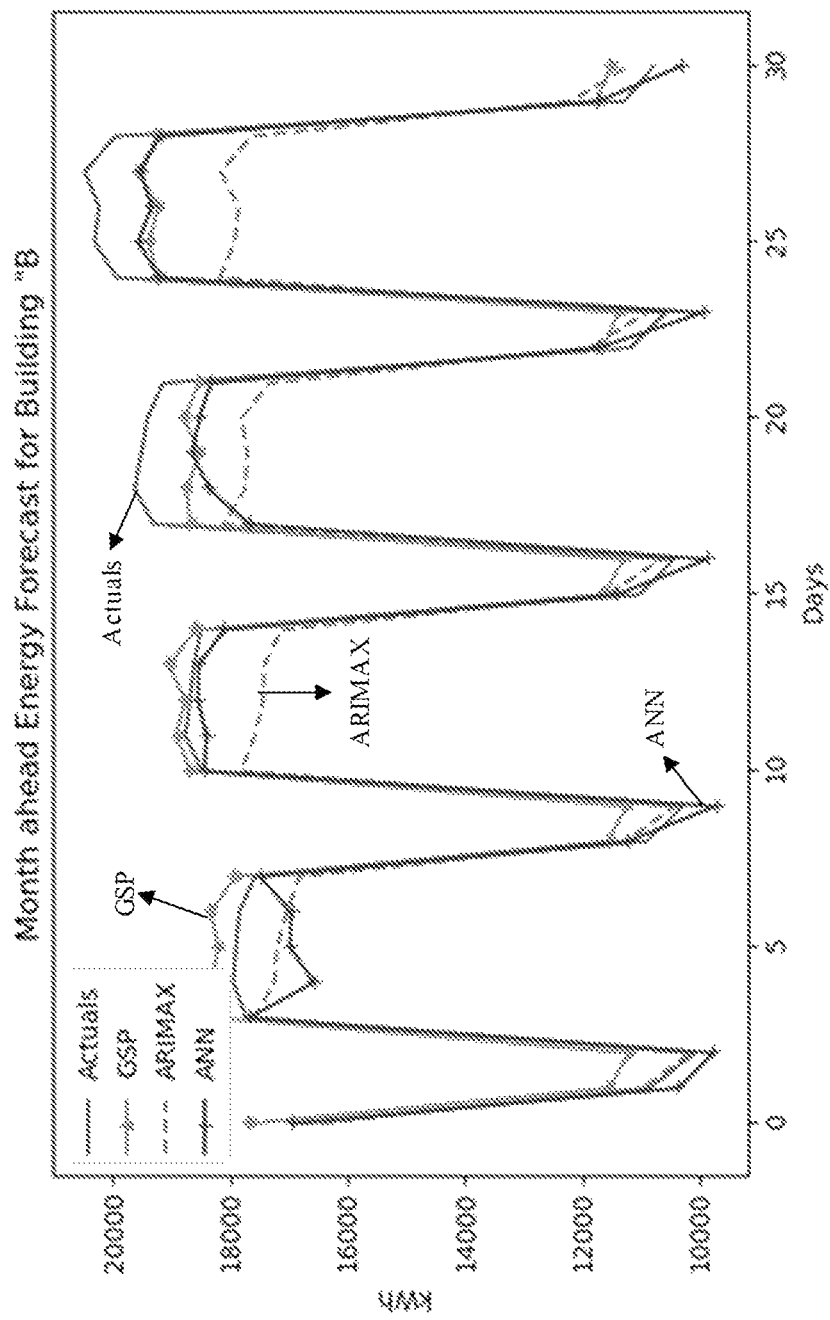
FIG. 4D is an example of graphical representations depicting month ahead forecast by the system of FIG. 1, and comparison with a few state of the art techniques, in accordance with some embodiments of the present disclosure.

Month and Quarter ahead forecasting involves forecasting day-wise energy consumption for the next one month and three months respectively. Month and Quarter ahead energy forecasting is required mainly for planning and budgeting reasons. The smart meter data is aggregated day-wise to create the day-wise energy consumption series. Unlike day ahead forecast, month and quarter ahead forecasts are challenging as it requires to forecast the independent parameters like temperature, occupancy for the period of the forecast horizon. Comparison of month ahead and quarter ahead forecasts generated by the system 100 and state of the art techniques (i.e., ARIMAX and ANN), and actual values, are depicted in FIG. 4C and FIG. 4D respectively.

Temperature: Maximum and minimum day-wise temperatures are used. Temperature Forecasts for the period of forecast horizon were extracted from weather websites.

Occupancy Forecasting: Day-wise average occupancy was used to build the models. Occupancy for the forecast horizon was predicted using the disclosed GSP based approach. Occupancy is taken as the graph signal and the weight matrix is calculated using day of the week, working day or holiday as the input parameters. Let $O_i$ be the average occupancy of the $i^{th}$ day and assumption is that occupancy values for the first n time instants are available and that estimate for next h time instants are required. A similar graph G=(V, Ao) is constructed, where each vertex is associated to the average occupancy value of a particular day. N=n+h−length graph signal $s_0$ similar to the energy usage graph signal is generated as:

$$s_0 = \begin{cases} O_i & \text{if } i \leq n \\ 0 & \text{otherwise} \end{cases} \quad (11)$$

Second part of the signal represented by equation (11) is computed to get estimate of average occupancy of the building.

The system 100 creates a weight matrix $A_0$ for this graph, which is created such that the weights of the edges between the two vertices describe their correlation. In general, office buildings' average occupancy varies largely for working days, weekends and holidays. So, the weight of the edge between a vertex representing a weekday, and a vertex representing either a weekend or a holiday is considered as 0 (i.e., no edge between these two vertices). The average occupancy on two different weekdays also varies to some extent. Hence, an edge should exist between two vertices representing the same day of the week. Weights of all the existing edges can be taken as 1. Then the smooth signal is generated using the total variation minimization approach and minimizing the total variation. Thereby the estimated occupancy values to generate the forecast on energy usage on the building are obtained. Day of the week and Holidays information for the period of forecast horizon are extracted from the calendar and location-specific holidays list.

All these input parameters are then used for graph construction by the system 100. The covariance matrix is generated such that it captures the interactions among the impacting variables like temperature, occupancy, day of the week etc. The N-length graph signal is generated using energy data s as follows:

$$s = \begin{cases} e_i & \text{if } i \leq n \\ 0 & \text{otherwise} \end{cases} \quad (12)$$

The weight adjacenary matrix is calculated as:

$$A(i, j) = \exp\left(-\Delta c_{i,j}^T \sum\nolimits^{-1} \Delta c_{i,j}\right) \text{ and} \quad (13)$$

$$= \begin{bmatrix} \sigma_{tt} & \sigma_{to} & \sigma_{td} \\ \sigma_{ot} & \sigma_{oo} & \sigma_{od} \\ \sigma_{dt} & \sigma_{do} & \sigma_{dd} \end{bmatrix} \quad (14)$$

Where, the elements $\sigma_{tt}$, $\sigma_{oo}$, and $\sigma_{dd}$ are variances of temperature, occupancy, and day of the week respectively. Other elements such as $\sigma_{to}$ represent covariance between temperature and occupancy data and a similar explanation goes for other elements in the matrix. The above-mentioned graph signal and covariance matrix are further used in the total variation minimization equations i.e., equations 4 through 10, to estimate the energy consumption.

Edge weights obtained through covariance matrix further dictates the inter-relationship between the nodes, providing useful strength for GSP framework for building energy modelling and forecasting. The models developed are validated using the data from four buildings and comparisons were carried out with ARIMAX and ANN algorithms.

In FIG. 4C, it can be seen that GSP based proposed formulation outperformed ARIMAX and is on par with ANNs. The metrics comparison is given only for Quarter ahead forecast in Tables 1 and 2 as the performance for month ahead forecast were also similar.

TABLE 1

| BUILDING | GSP | ARIMAX | ANN |
| --- | --- | --- | --- |
| A | 6.5 | 7.5 | 5 |
| B | 8 | 10 | 7.5 |
| C | 7 | 9 | 8 |
| D | 9.5 | 13 | 10 |

TABLE 2

| BUILDING | GSP | ARIMAX | ANN |
| --- | --- | --- | --- |
| A | 0.09 | 0.107 | 0.07 |
| B | 0.10 | 0.12 | 0.09 |
| C | 0.09 | 0.11 | 0.09 |
| D | 0.09 | 0.15 | 0.13 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of Graph Signal Processing (GSP) based energy consumption forecasting for buildings. The embodiment thus provides a mechanism to model the energy consumption of a building by processing energy consumption related data and associated energy consumption parameters using the GSP.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of building energy forecasting, the method comprising:
  collecting data on energy consumption in a building for a pre-defined time window and a plurality of energy consumption parameters, as input, via one or more hardware processors;
  generating a building energy consumption model by processing the plurality of energy consumption parameters via the one or more hardware processors, using a Graph Signal Processing (GSP) modelling, comprising:
    constructing a graph for a measured energy value of the building, comprising:
      building a weighted adjacent matrix of the GSP using the plurality of energy consumption parameters, wherein the plurality of energy consumption parameters are occupancy of the building, weather information of a region in which the building is located, and selected time of a day, a selected day of a week and holiday information for which forecasting is to be performed;
      using samples of the measured energy value as nodes of the graph; and
      determining weight of edge between each set of nodes of a graph for each sample of the measured energy value, based on a) vector difference between the plurality of energy consumption parameters, and b) a co-variance matrix of the plurality of energy consumption parameters, wherein the weight of each edge is calculated for a pre-defined time window;
  generating a smooth signal by minimizing variation of the graph by performing total variation minimization on the graph, via the one or more hardware processors;
  generating forecast using the smooth signal, via the one or more hardware processors, wherein the forecast generated is one of a day-ahead forecast, month-ahead forecast, or a quarter-ahead forecast, wherein generating the one day ahead forecast comprises:
    fetching hourly energy consumption data, and the plurality of energy consumption parameters as input;
    generating the building energy consumption model using the hourly energy consumption data and the plurality of energy consumption parameters; and
    filling a plurality of missing values in the graph using the generated forecast, via the one or more hardware processors.

2. The method as claimed in claim 1, wherein generating the month-ahead forecast and the quarter-ahead forecast comprises:
  obtaining day-wise aggregated energy consumption data and the plurality of energy consumption parameters for a time window representing the month or quarter;
  generating the building energy consumption model using the day-wise aggregated energy consumption data and the plurality of energy consumption parameters; and
  generating the forecast using a smooth signal obtained by minimizing variation of the graph.

3. A system for building energy forecasting, the system comprising:
  one or more hardware processors;
  a communication interface; and
  a memory storing a plurality of instructions, wherein the plurality of instructions when executed, cause the one or more hardware processors to:
    collect data on energy consumption in a building for a pre-defined time window and a plurality of energy consumption parameters, as input;
    generate a building energy consumption model by processing the plurality of energy consumption parameters, using a Graph Signal Processing (GSP) modelling, comprising:
      constructing a graph for a measured energy value of the building, comprising:
        building a weighted adjacent matrix of the GSP using the plurality of energy consumption parameters, wherein the plurality of energy consumption parameters are occupancy of the building, weather information of a region in which the building is located, and selected time of a day, a selected day of a week and holiday information for which forecasting is to be performed;
        using samples of the measured energy value as nodes of the graph; and
        determining weight of edge between each set of nodes of a graph for each sample of the measured energy value, based on a) vector difference between the plurality of energy consumption parameters, and b) a co-variance matrix of the plurality of energy consumption parameters, wherein the weight of each edge is calculated for a pre-defined time window;
    generate a smooth signal by minimizing variation of the graph by performing total variation minimization on the graph;
    generate forecast using the smooth signal, wherein the forecast generated is one of a day-ahead forecast, month-ahead forecast, or a quarter-ahead forecast, wherein generating the one day ahead forecast comprises:
      fetching hourly energy consumption data, and the plurality of energy consumption parameters as input;
      generating the building energy consumption model using the hourly energy consumption data and the plurality of energy consumption parameters; and
      fill a plurality of missing values in the graph using the generated forecast.

4. The system as claimed in claim 3, wherein the system generates the month-ahead forecast and the quarter-ahead forecast by:
  obtaining day-wise aggregated energy consumption data and the plurality of energy consumption parameters for a time window representing the month or quarter;
  generating the building energy consumption model using the day-wise aggregated energy consumption data and the plurality of energy consumption parameters; and
  generating the forecast using a smooth signal obtained by minimizing variation of the graph.

5. One or more non-transitory machine-readable information storage mediums comprising one or more instructions which when executed by one or more hardware processors cause:
  collecting data on energy consumption in a building for a pre-defined time window and a plurality of energy consumption parameters, as input, via one or more hardware processors;
  generating a building energy consumption model by processing the plurality of energy consumption parameters via the one or more hardware processors, using a Graph Signal Processing (GSP) modelling, comprising:

constructing a graph for a measured energy value of the building, comprising:
   building a weighted adjacent matrix of the GSP using the plurality of energy consumption parameters, wherein the plurality of energy consumption parameters are occupancy of the building, weather information of a region in which the building is located, and selected time of a day, a selected day of a week and holiday information for which forecasting is to be performed;
   using samples of the measured energy value as nodes of the graph; and
   determining weight of edge between each set of nodes of a graph for each sample of the measured energy value, based on a) vector difference between the plurality of energy consumption parameters, and b) a co-variance matrix of the plurality of energy consumption parameters, wherein the weight of each edge is calculated for a pre-defined time window;
generating a smooth signal by minimizing variation of the graph by performing total variation minimization on the graph, via the one or more hardware processors;
generating forecast using the smooth signal, via the one or more hardware processors, wherein the forecast generated is one of a day-ahead forecast, month-ahead forecast, or a quarter-ahead forecast, wherein generating the one day ahead forecast comprises:
   fetching hourly energy consumption data, and the plurality of energy consumption parameters as input;
   generating the building energy consumption model using the hourly energy consumption data and the plurality of energy consumption parameters; and
   filling a plurality of missing values in the graph using the generated forecast, via the one or more hardware processors.

6. The one or more non-transitory machine-readable information storage mediums of claim 5, wherein generating the month-ahead forecast and the quarter-ahead forecast comprises:
   obtaining day-wise aggregated energy consumption data and the plurality of energy consumption parameters for a time window representing the month or quarter;
   generating the building energy consumption model using the day-wise aggregated energy consumption data and the plurality of energy consumption parameters; and
   generating the forecast using a smooth signal obtained by minimizing variation of the graph.

\* \* \* \* \*